[11] 3,607,774

| [72] | Inventor | William Cummings Marford, Flintshire, Wales, England |
|---|---|---|
| [21] | Appl. No. | 846,232 |
| [22] | Filed | July 30, 1969 |
| [45] | Patented | Sept. 21, 1971 |
| [73] | Assignee | Monsanto Chemicals Limited London, England |
| [32] | Priority | Aug. 8, 1968 |
| [33] | | Great Britain |
| [31] | | 37,837/68 |

[54] PRODUCTION OF SILICA SOLS
7 Claims, No Drawings

[52] U.S. Cl. .................................................. 252/313 S, 23/182
[51] Int. Cl. ......................................................... C01b 33/14
[50] Field of Search ........................................... 23/182, 110; 252/313

[56] References Cited
UNITED STATES PATENTS

| 2,601,235 | 6/1952 | Alexander et al. | 23/182 |
| 3,012,972 | 12/1961 | Rule | 252/313 |
| Re. 25,252 | 10/1962 | Reuter et al. | 252/313 |
| 3,128,251 | 4/1964 | Reven et al. | 252/313 |
| 3,342,747 | 9/1967 | Mindick et al. | 252/313 |
| 3,374,180 | 3/1968 | Marotta | 252/313 |
| 3,440,176 | 4/1969 | Sippel | 252/313 |
| 3,502,593 | 3/1970 | Mindick | 252/313 |

FOREIGN PATENTS

| 1,143,019 | 2/1969 | Great Britain | 23/182 |

Primary Examiner—Edward Stern
Attorneys—Richard W. Sternberg and Roger R. Jones

ABSTRACT: This invention relates to a process for producing aquasols and products thereof in which the silica particles have a dissymmetry diameter greater than 500 A. which involves adding aqueous silicic acid having a pH less than 7 to a heated vessel containing a heel, an aqueous alkali metal silicate (i.e., sodium silica) solution having an initial concentration expressed as $SiO_2$ of from about 2.5 percent to 10 percent by weight with the quantity of aqueous silicic acid added being such that the molar ratio of $SiO_2$ added as silicic acid to $M_2O$ content of the alkali metal silicate in the heel (where M is an alkali metal atom) is at least 25:1.

PRODUCTION OF SILICA SOLS

This invention relates to a process for the production of silica sols, in particular to a process for the production of silica aquasols.

Silica aquasols, that is dispersions of silica of colloidal particle size in aqueous media are materials of commerce. Various kinds are known, and the appearance, properties and use of a silica aquasol depend to a large extent on the average particle size of the silica.

The present invention provides a new process for making silica aquasols in which the average particle size is such that the product is "milky" in appearance, in contrast to translucent or clear sols characteristic of smaller diameter particles, and is an improvement in or modification of the invention described in British Pat. Specification No. 1,143,019 assigned to the same assignee as the present application.

The latter relates to a process for the production of an aqueous dispersion of silica particles having a dissymmetry diameter greater than 500 A., in which aqueous silicic acid having an acid pH is added to a heated vessel containing a heel comprising a dispersion of silica particles having a dissymmetry diameter greater than 500 A. in an aqueous alkali metal silicate solution and water is evaporated from the vessel during the addition of the silicic acid, the initial composition of the heel being such that the molar ratio of $M_2O$ (where M represents an alkali metal) to overall $SiO_2$ is from 1:5 to 1:40, and the quantity of aqueous silicic acid added being such that the silica present as particles having a dissymmetry diameter of not less than 500 A. in the initial heel represents not less than 1 percent of the total silica content of the product and such that the molar ratio of overall silica to $M_2O$ in the product is not less than 500. The dissymmetry diameter is a measure of the average particle size and is determined as described by P. Debye, J. Physical Chemistry 1947, 51, 18 and B. R. Jennings and H. G. Gerrard, J. Colloid Science, 1965, 20, 448.

We have now discovered that sols essentially similar to the "milky" sols obtainable by the above process can be made by a procedure which is somewhat more straightforward in that the original heel can be simply an aqueous alkali metal silicate solution instead of a dispersion of preformed silica particles in such a solution.

The process of the present invention is accordingly one for the production of a silica aquasol in which the silica particles have a dissymmetry diameter greater than 500 A., which comprises adding aqueous silicic acid having a pH less than 7 to a heated vessel containing as a heel an aqueous alkali metal silicate solution having an initial concentration expressed as $SiO_2$ of from 2.5 percent to 10 percent by weight, the quantity of aqueous silicic acid added being such that the molar ratio of the $SiO_2$ added as silicic acid to the $M_2O$ content of the alkali metal silicate in the heel (where M is an alkali metal atom) is at least 25:1.

In the alkali metal silicate solution, the molar ratio of $SiO_2$ to $M_2O$ can be for example from 1:1 to 4.5:1 and is usually from 2:1 to 4:1. The alkali metal silicate solution of the heel is usually sodium silicate. Other alkali metal silicates, for example potassium silicate or a mixture of alkali metal silicates can be used, but their use is usually excluded on economic grounds.

As indicated above, a feature of the present process is that there is no need for the heel to contain preformed silica particles. On the other hand, the presence of small amounts of such particles does not adversely effect the operation of the process. For example, where a reaction vessel is used to make a succession of batches of sol, the heel of one batch may contain traces of sol left in the vessel from the previous batch. Where silica particles are present, the quantity should be such that the molar ratio of overall $SiO_2$ (i.e. $SiO_2$ present as particles plus that present as alkali metal silicate) to $M_2O$ is less than 5:1 and the condition that the concentration of silicate in solution is within the stated range must be met. Preferably the heel consists essentially of the aqueous alkali metal silicate solution, that is to say it is initially free or substantially free of colloidal silica particles.

In practice, the process of the invention is usually conducted in a vessel equipped with a stirrer or other means for keeping the contents of the vessel in motion, and water is allowed to evaporate during the addition of at least part of the silicic acid solution. The process is normally carried out at atmospheric pressure and the contents of the vessel are held at or near the boiling point to give a process temperature of about 100° C. Elevated or reduced pressures giving boiling points above or below 100° C. can be used, but preferably the temperature during the addition of the silicic acid should be not less than 90° C., and operation below about 80° C., at least during the addition, may have an adverse effect on the product.

The amount and concentration of the silicic acid solution and the relative rates of evaporation and addition are usually such that the volume of the sol exceeds that of the initial alkali metal silicate solution. The rate of increase in volume need not be constant however. At a given rate of evaporation there appears to be a correlation between the rate of addition of the silicic acid during the early stages of the process and the average particle size of the product, the slower the rate of addition the larger the particle. This in turn is related to the fact that the concentration of the initial alkali metal silicate solution in the heel is a principal factor in determining the average particle size of the product, which increases with the concentration of the solution. Thus too rapid a dilution of the initial heel by allowing the rate of addition of the silicic acid to outstrip by too great a margin the rate of evaporation is to be avoided, and in a preferred manner of operating, the balance between the two rates is adjusted such that the concentration of silicate in solution in the vessel contents expressed as $SiO_2$ does not fall below 2.5 percent by weight of the solution (i.e. of the combined weight of water and soluble silicate) until the molar ratio of $SiO_2$ added as silicic acid to the $M_2O$ in solution is at least 20:1.

The process of the invention is of particular value for the production of sols having dissymmetry diameters of from about 750 A. to 1,500 A., for example from about 1,000 A. to 1,500 A. and the corresponding alkali metal silicate solutions used to form the heel are those having $SiO_2$ concentrations of from 3 to 5 percent by weight.

The molar ratio of the $SiO_2$ added as aqueous silicic acid to the $M_2O$ present in the heel also has an effect on the particle size of the product. The higher this ratio, the larger is the particle size of the product. The ratio should be at least 25:1, for example from 25:1 to 500:1, and is preferably from 50:1 to 250:1 and more preferably from 100:1 to 200:1. The preferred ratios give sols having pH's measured at 20° C. in the range 8.5 to 11.0, more especially 8.7 to 10.5.

The sols produced by the present process can have any desired concentration of silica within a wide range. For certain applications, sols having a silica content of about 15 percent by weight are required; more usually, more concentrated products are preferred, for instance sols containing at least 20 percent by weight of silica, and preferably from 30 percent to 50 percent or even more, for example up to 55 or 60 percent or even 65 percent by weight of silica. Such sols can be obtained by a process in which the rates of evaporation and addition are adjusted to that the product on completion of the addition has the required concentration of silica. In another method of producing a concentrated silica sol, the process of the invention as defined above is used to produce a dilute silica sol containing up to 15 percent, for example from 4 percent to 10 percent, and more especially from 5 percent to 7 percent by weight of silica. The dilute silica sol is then evaporated without the addition of further silicic acid until the required concentration of silica in the residual sol is reached. The sol remains stable during concentration and the particle size is substantially unaltered. It is also possible to evaporate the dilute sol under reduced pressure at temperatures lower than would be considered desirable during the formation of sol from silicic acid. Economies of operation can thus be achieved since more efficient evaporators can be employed.

There is, in general, a preferred minimum time of heating and correspondingly a preferred maximum rate of evaporation during the formation of the sol. What this is depends on a variety of factors including the scale of operations and the heat transfer characteristics of the vessel employed. Accordingly, a certain amount of experimentation may be required to establish optimum conditions in any particular instance. In our experience, addition of the silicic acid over a period of from 3 to 25 hours generally gives satisfactory results, and the optimum period is often from 6 to 12 hours.

Under a given set of process conditions, the majority of the silica particles in the product have diameters which vary within a range of perhaps 200 or 300 A., but some smaller and larger particles are formed. Particles having a diameter of from 500 A. to about 2,500 A. remain suspended in an aqueous dispersion medium for an almost indefinite period, while larger particles tend to deposit on standing to form a sediment. Accordingly, the process of the invention may include a further stage in which the initial product is separated into fractions corresponding to different ranges of particle size. The separation can be a simple decantation of a supernatant sol from a sediment which has formed after the initial product has been stored for a given period of time, or the initial product can be centrifuged.

Several methods of preparing silicic acid are known in the art. Aqueous silicic acid can be regarded as containing silica in an "active" form which readily undergoes polymerization. Accordingly aqueous silicic acid compositions are relatively unstable and in general exist in liquid form only at low concentrations corresponding to not more than about 4 percent or 5 percent by weight of silica, although higher concentrations for example up to 8 percent can be obtained under certain conditions.

The preferred aqueous silicic acid in the present instance is obtained by contacting a dilute alkali metal silicate solution, usually sodium silicate, with a cation exchange resin in the hydrogen form as described for instance in British Pat. Specification 645,703. A sufficiently high proportion of the alkali metal ions is removed for the product to have an acid pH. Thus the aqueous silicic acid will normally have a pH at 15° C. not greater than 6 and preferably the pH at 15° C. lies within the range 2.5 to 4.0. A silicic acid of this type has a limited storage life, and it is therefor advantageous to operate the process for the production of the silicic acid in series with the main process of the invention so that there in minimum delay in using the silicic acid after it is prepared. It is desirable not to use a silicic acid solution that is more dilute than necessary, and solutions having $SiO_2$ concentrations of from 3 to 4 percent by weight represent a satisfactory compromise between concentration and stability. The preparation of the silicic acid can also include a treatment with an anion exchange resin whereby extraneous anions, for example chloride and sulfate, which are usually present in commercial alkali metal silicate solutions, are removed. A form of treatment to remove anions or to reduce the anion concentration to an acceptable level is essential where the silicic acid is prepared by a method which involved the production of anions as byproduct, for example the hydrolysis of silicon tetrachloride or of silicon sulfide.

The invention is illustrated by the following examples. The silicic acid used was obtained by percolation of a dilute solution of sodium silicate through a column of cation exchange resin in the hydrogen ion form and then through a column of anion exchange resin in the hydroxyl ion form.

EXAMPLE 1

A solution of 13 grams of sodium silicate (containing 3 grams of sodium oxide and 10 grams of silica) in 237 grams of water i.e. a solution having a concentration expressed as $SiO_2$ of 4 percent by weight, was boiled and stirred in a 500 ml. flask. To this solution, 2,559 grams of an aqueous solution of silicic acid having a silica concentration of 3.82 percent by weight and a pH of 3.12 were added at a constant rate over 3.5 hours. Water was evaporated from the mixture at such a rate that the volume of the mixture in the flask increased gradually to about 300 ml. The whole of the product was then transferred to a 1-liter flask and, while continuing to boil and stir, a further 3,583 grams of the aqueous solution of silicic acid were added at a constant rate over 4 hours. Water was evaporated from the stirred mixture at such a rate that the volume of the mixture increased gradually to about 709 ml. giving 850 grams of a sol having a silica concentration of 29.2 percent by weight.

250 grams of this sol were boiled in a 500 ml. flask and a further 1,914 grams of the aqueous solution of silicic acid were added at a constant rate over 3.75 hours. Water was evaporated from the mixture at such a rate that the volume increased to about 250 ml. to give 330 grams of a milky sol having the following properties:

Silica concentration: 43.8% (w/w)
$Na_2O$ concentration (by titration with acid to pH 3.5): 0.0594% (w/w)
pH at 20° C.: 8.82
Viscosity at 21° C. (Redwood): 7.6 Centipoises
Specific surface area (by titration): 68 m²/g. $SiO_2$
Dissymmetry diameter of particles (by light scattering): 1,200 A.
Molar ratio of $SiO_2$ added as silicic acid to $Na_2O$ in the heel = 166:1.

EXAMPLE 2

A solution of 7.17 grams of sodium silicate (containing 1.67 grams of sodium oxide and 5.5 grams of silica) in 148.4 grams of water i.e. a solution having a concentration expressed as $SiO_2$ of 3.33 percent by weight, was boiled and stirred in a 1-liter flask. 824 grams of an aqueous solution of silicic acid, having a silica concentration of 3.36 percent by weight and a pH of 3.0, was added at a constant rate over 4 hours to the boiling and stirred solution of sodium silicate and during that time a total of 430 grams of water was evaporated from the mixture at a constant rate. The volume of this intermediate sol was 510 ml.

255 ml. of the intermediate sol were boiled and stirred in a 2-liter flask. 1,647 grams of the aqueous solution of silicic acid were added at a constant rate over 4 hours and afterwards a further 893 grams of the aqueous solution of silicic acid were added at a constant rate over the next 4 hours. A total of 1,542 grams of water was evaporated from the mixture at a constant rate over the 8 hours during which the silicic acid was added. Finally, an additional 570 grams of water were evaporated to give 690 grams of a milky sol having the following properties:

Silica concentration: 14.8% w/w.
$Na_2O$ concentration (by titration with acid to pH 3.5): 0.071% w/w.
pH at 20° C.: 10.4
Specific surface area (by titration): 103 m.²/g. $SiO_2$
Molar ratio of $SiO_2$ added as silicic acid to $Na_2O$ in the heel = 123 : 1.
Dissymmetry diameter of particles 510 A.

The procedure for the titration method used in the determination of the specific surface areas of the products of the Examples is given by Sears, Analytical Chemistry, 1956, 28, 1981.

EXAMPLE 3

A solution of 6.79 grams of sodium silicate (containing 1.58 grams of sodium oxide and 5.21 grams of silica) in 148.5 grams of water, i.e. a solution having a concentration expressed as $SiO_2$ of 3.35 percent by weight was boiled and stirred in a 1-liter flask. 824 grams of an aqueous solution of silicic acid having a silica concentration of 3.36 percent by weight and a pH of 3.0 was added at a constant rate over 4 hours and afterwards a further 403 grams of the aqueous solution of silicic acid were added at a constant rate over the next 4 hours. A total of 798 grams of water was evaporated from the mixture at a constant rate over the 8 hours during which the silicic acid was added. The volume of this intermediate sol was 550 ml.

220 ml. of the intermediate sol and 80 grams of water were boiled and stirred in a 2-litre flask. 1,642 grams of the aqueous solution of silicic acid were added at a constant rate over 4 hours and afterwards a further 857 grams of the aqueous solution of silicic acid were added at a constant rate over the next 4 hours. A total of 1,642 grams of water was evaporated from the mixture at a constant rate over the 8 hours during which the silicic acid was added. Finally, an additional 490 grams of water evaporated to give 676 grams of a milky sol having the following properties:

Silica concentration: 15.0% w/w
$Na_2O$ concentration (by titration with acid to pH 3.5): 0.0432% w/w.
pH at 20°: 9.92
Specific surface area (by titration): 97 m.²/g.: $SiO_2$
Molar ratio of $SiO_2$ added as silicic acid to $Na_2O$ in the heel = 164 : 1
Dissymmetry diameter of particles 586 A.

EXAMPLE 4

A solution of 6.79 grams of sodium silicate (containing 1.58 grams of sodium oxide and 5.21 grams of silica) in 138.5 grams of water, i.e. a solution having a concentration expressed as $SiO_2$ of 3.58 percent by weight, was boiled and stirred in a 1-liter flask. 1,248 grams of an aqueous solution of silicic acid having a silica concentration of 3.4 percent by weight and a pH of 3.0 was added at a constant rate over 8 hours to the boiling and stirred solution of sodium silicate and during that time a total of 800 grams of water was evaporated from the mixture at a constant rate. The volume of this intermediate sol was 585 ml.

235 ml. of the intermediate sol and 60 grams of water were boiled and stirred in a 2-liter flask. 2,461 grams of the aqueous solution of silicic acid were added at a constant rate over 8 hours and during that time a total of 1,612 grams of water were evaporated from the mixture. Finally, an additional 405 grams of water were evaporated to give 690 grams of a milky sol having the following properties:

Silica concentration: 15.0% w/w.
$Na_2O$ concentration (by titration with acid to pH 3.5): 0.0362% w/w.
pH at 20° C.: 9.9
Specific surface area (by titration): 71 m.²/g.: $SiO_2$.
Molar ratio of $SiO_2$ added as silicic acid to $Na_2O$ in the heel = 164:1.
Dissymmetry diameter of particles 922 A.

EXAMPLE 5

A solution of 45.62 grams of sodium silicate (containing 10.61 grams of sodium oxide and 35.01 grams of silica) in 829.7 grams of water, i.e. a solution having a concentration expressed as $SiO_2$ of 4.0 percent by weight, was boiled and stirred in a 5-liter flask. 7,344 grams of an aqueous solution of silicic acid having a silica concentration of 3.4 percent by weight and a pH of 3.0 were added at a constant rate over 8 hours to the boiling and stirred solution of sodium silicate and during that time a total of 4,809 grams of water was evaporated from the mixture at a constant rate. The volume of this intermediate sol was 3,340 ml.

668 ml. of the intermediate sol and 172 grams of water were boiled and stirred in a 5-liter flask. 7,344 grams of the aqueous solution of silicic acid were added at a constant rate over 8 hours and during that time a total of 4,800 grams of water was evaporated from the mixture at a constant rate. Finally, an additional 1,114 grams of water were evaporated to give 2,130 grams of a milky sol having the following properties:

Silica concentration: 14.2% w/w.
$Na_2O$ concentration (by titration with acid to pH 3.5): 0.0398% w/w.
pH at 20° C.: 10.2
Sp. surface area (by titration): 63 m.²/g. $SiO_2$
Molar ratio of $SiO_2$ added as silicic acid to $Na_2O$ in the heel = 141:1

1,414 grams of water were evaporated from 1,970 grams of the 14.2 percent sol to give 556 grams of milky sol having the following properties:

Silica concentration: 50.3% w/w.
pH at 20° C.: 10.0
Viscosity (Ferranti) at 21° C.: 14.8 cps.
Dissymmetry diameter of particles 1,047 A.

What is claimed is:

1. A process for the production of a silica aquasol in which the silica particles have a dissymmetry diameter greater than 500 A., which comprises adding aqueous silicic acid having a pH less than 7 to a heated vessel containing as a heel an aqueous alkali metal silicate solution having an initial concentration expressed as $SiO_2$ of from 2.5 percent to 10 percent by weight, the quantity of aqueous silicic acid added being such that the molar ratio of the $SiO_2$ added as silicic acid to the $M_2O$ content of the alkali silicate in the heel (where M is an alkali metal atom) is at least 25:1.

2. A process according to claim 1 wherein the dissymmetry diameter is from about 750 A. to 1,500 A., the molar ratio of the $SiO_2$ added as silicic acid to the $M_2O$ content of the alkali metal silicate in the heel is from about 25:1 to 500:1, the contents of the vessel are maintained at a temperature not less than 90° C. and water is evaporated from the vessel during the addition of at least part of the silicic acid solution.

3. A process according to claim 2 wherein the aqueous silicic acid has a pH at 15° C. of from 2.5 to 4.0, the aqueous alkali metal silicate solution in said heel has an initial concentration expressed as $SiO_2$ of from about 3 percent to 5 percent by weight of the silica and has a molar ratio of $SiO_2$ to $M_2O$ of from 2:1 to 4:1, the quantity of aqueous silicic acid added being such that the molar ratio of $SiO_2$ added as silicic acid to the $M_2O$ content of the alkali silicate in the heel is from about 50:1 to 250:1 and wherein the contents of the vessel are maintained substantially at the boiling point at atmospheric pressure.

4. The process according to claim 3 in which the relative ratio of addition of silicic acid solution and evaporation of water is such that the concentration of silicate in solution expressed as $SiO_2$ does not fall below 2.5 percent by weight of the solution until the molar ratio of $SiO_2$ added as silicic acid to the $M_2O$ in solution is at least 20:1.

5. A process according to claim 4 wherein the alkali metal silicate is sodium silicate.

6. A process according to claim 5 in which the relative rates of addition of silicic acid solution and evaporation of water is such that at the end of the addition, the sol contains from 4 to 10 percent by weight of silica.

7. A process according to claim 6 in which water is evaporated without the addition of further silicic acid to produce a sol containing from about 20 to 60 percent by weight of silica.